(12) United States Patent
Sawall et al.

(10) Patent No.: US 8,403,125 B2
(45) Date of Patent: *Mar. 26, 2013

(54) HANGING CHUTE

(75) Inventors: Kirk D. Sawall, Gallatin, TN (US); Dale R. Brenholt, Cushing, WI (US); Gabriel G. Feuerheim, Richmond, WI (US)

(73) Assignee: Durex Products, Inc., Luck, WI (US)

( * ) Notice: Subject to any disclaimer, the term of this patent is extended or adjusted under 35 U.S.C. 154(b) by 70 days.

This patent is subject to a terminal disclaimer.

(21) Appl. No.: 12/846,966

(22) Filed: Jul. 30, 2010

(65) Prior Publication Data

US 2010/0288599 A1 Nov. 18, 2010

Related U.S. Application Data

(63) Continuation of application No. 12/399,230, filed on Mar. 6, 2009, now Pat. No. 7,784,596, which is a continuation of application No. 11/668,335, filed on Jan. 29, 2007, now Pat. No. 7,513,352.

(51) Int. Cl.
*B65G 11/10* (2006.01)
(52) U.S. Cl. .................. 193/25 R; 193/25 A; 193/25 C
(58) Field of Classification Search .............. 193/25 R, 193/25 A, 25 C
See application file for complete search history.

(56) References Cited

U.S. PATENT DOCUMENTS

| | | | |
|---|---|---|---|
| 2,753,962 A * | 7/1956 | McBerty ..................... 52/93.1 |
| 3,307,452 A | 3/1967 | Meunier | |
| 3,339,690 A | 9/1967 | Craig | |
| 4,054,194 A | 10/1977 | Davis | |
| 4,190,988 A * | 3/1980 | Carreiro ........................ 52/16 |
| 4,362,231 A | 12/1982 | Meyer | |
| 4,379,551 A | 4/1983 | Ahrens | |
| 4,487,411 A | 12/1984 | Ahrens | |
| 4,646,487 A | 3/1987 | Andersson | |
| 4,889,219 A | 12/1989 | Key | |
| D314,996 S | 2/1991 | Olsen | |
| 5,015,122 A | 5/1991 | Combes | |
| 5,020,651 A | 6/1991 | Lockett | |
| 5,035,313 A | 7/1991 | Smith | |
| D330,743 S | 11/1992 | Mercer | |
| 5,184,706 A | 2/1993 | Christenson | |
| 5,216,852 A * | 6/1993 | Bemis et al. ..................... 52/12 |
| 5,244,069 A | 9/1993 | Cosgrove | |
| 5,406,756 A * | 4/1995 | Bemis et al. ..................... 52/16 |
| 5,472,768 A | 12/1995 | Anson | |
| 6,106,141 A | 8/2000 | Bruun | |
| 6,186,304 B1 | 2/2001 | Hakansson | |
| 6,254,039 B1 | 7/2001 | Zimmerman | |
| 6,425,351 B1 | 7/2002 | Mollhagen | |
| 6,499,582 B1 | 12/2002 | Gillott | |
| 6,517,283 B2 | 2/2003 | Coffey | |
| 6,634,485 B1 | 10/2003 | Cailbault | |
| 6,708,742 B2 | 3/2004 | Weathers et al. | |
| 6,726,155 B1 | 4/2004 | Zimmerman | |
| 6,840,715 B2 | 1/2005 | Crovara Pescia | |
| 6,868,953 B1 | 3/2005 | Thompson | |
| D505,436 S | 5/2005 | Griggs et al. | |

(Continued)

*Primary Examiner* — Mark A Deuble
(74) *Attorney, Agent, or Firm* — Frost Brown Todd LLC

(57) ABSTRACT

A hanging chute with a rib cage is described. In accordance with one embodiment of the invention, a chute constructed from flexible wear material with a rib cage to reinforce the chute. In particular, several ribs are dispersed throughout the length of the flexible sheet for support. A flexible sheet has a reinforced edge with varying thicknesses to accommodate different weight loads and abrasive conditions. Furthermore, the chute has interlocking edges for ease of constructing long lengths from a series of shorter sections. These shorter sections are easier to transport to a processing plant or other site where the chute is to be installed. Preferably the chute is easily maintainable and can incorporate wear inserts for additional wear resistance.

20 Claims, 4 Drawing Sheets

U.S. PATENT DOCUMENTS

| | | |
|---|---|---|
| 6,931,771 B1 | 8/2005 | Liebl |
| 6,938,749 B1 | 9/2005 | Quigley et al. |
| 6,986,240 B2 | 1/2006 | Kallevig |
| 7,513,352 B2 | 4/2009 | Sawall et al. |
| 7,784,596 B2 | 8/2010 | Sawall et al. |

\* cited by examiner

HANGING CHUTE

RELATED APPLICATIONS

This application is a continuation of U.S. patent application Ser. No. 12/399,230, filed 6 Mar. 2009, entitled "Hanging Chute," which is a continuation of U.S. patent application Ser. No. 11/668,335, filed 29 Jan. 2007, entitled "Hanging Chute," which has been issued as U.S. Pat. No. 7,513,352. The above applications are incorporated by reference herein.

BACKGROUND OF THE INVENTION

1. Field of the Invention

This invention relates to the field of mining and material handling, and in particular to a chute for conveying mining materials.

2. Description of Related Art

From high rises to highways, drainage pipes to railroad beds, houses to hospitals, the aggregate, cement, concrete and mining material industries provide the glue and buildings blocks of modern life. For example, we use them to build our schools and commercial buildings because concrete and aggregate products will not burn. Also, water purification systems are made from concrete products because they are clean and easy to maintain. At the same time, these products are natural and reusable. Sand, crushed stone, gravel, cement, and water in all of their combinations and forms are natural resources and part of the earth. Low in cost, natural aggregates are a major contributor to and an indicator of the economic well being of a nation.

It is important to note that more than three billion tons of aggregate were produced in the United States (U.S.) in 2004 with a value of approximately $16 billion, contributing $37.5 billion to the U.S. Gross Domestic Product. Every $1 million in aggregate sales creates 19.5 jobs, and every dollar of industry output returns $1.58 to the economy. Also, about ten tons of aggregate per person are used annually in the U.S. Every mile of interstate highway uses 38,000 tons of aggregate and about 400 tons of aggregate is used to build the average home.

Mining materials also have an amazing variety of other uses. Imagine our lives without wallboard and roofing tiles or without paint, glass, plastics, and medicine. When ground into powder, limestone is used as an important mineral supplement in agriculture, medicine and household products. Mining materials are also being used more and more to protect our environment. Soil erosion-control programs, water purification, and reduction of sulfur dioxide emissions generated by electric power plants are just a few examples of such uses.

Even after these materials are extracted and utilized, the job still is not finished. For example, what was once the bottom of a rock quarry can become a golf course, school, theme park or shopping center. Furthermore, these natural mining materials are a major basic raw material used by construction, agriculture, and industries. Mining industries employ complex chemical and metallurgical processes.

Carefully managing these valuable and limited resources is essential for the environment, economy, and future of a nation. For this reason, mining material producers, industry service providers and equipment suppliers are continually procuring ideas and innovations to help with the industry.

The mining industry utilizes a variety of methods to excavate such natural resources. These methods are dependent upon the geologic characteristics of the natural deposit. Open-pit mining and quarrying are commonly used. Other deposits require mining underground. Sand and gravel deposits above the water table are excavated with bulldozers, front-end loaders, tractor scrapers, and draglines. Deposits below the water table, including stream and lakebed deposits, may be excavated with draglines or from barges using hydraulic or ladder dredges. Mining and quarrying stone generally require drilling and blasting, after which the rock is then transported to a processing facility on trucks and conveyors.

Processing plants are generally constructed on the site of extraction. Processing of mined or quarried rock requires primary and possible secondary crushing, depending on the sizes of mining material needed. After crushing, the crushed stone, sand and gravel usually are sorted to size, moved by conveyors to bins or stockpiled.

Chutes associated with these processing steps are subjected to a great deal of wear and tear, not only by the impact and abrasion resulting from movement of the ore and other fluent material but also by the impact of other machinery or equipment. Impact and wear of the chutes will, over a period of time, result in significant deterioration. Another contributing factor to such deterioration is exposure of the chutes to the liquid components of mining materials.

One approach has been to weld liners of steel to the chutes. This is an expensive procedure requiring significant labor and hoisting machinery. Furthermore, chutes in a significant state of deterioration or chutes of certain types of materials are often not amenable to repair utilizing this approach. Use of steel or other metal liners also adds significant weight to the chute, which is undesirable.

Attempts have been made to coat chutes with plastic or elastomer materials; that is, a bond is created between the plastic and the chute material over the entire extent. This causes difficulties due to the difference in coefficients of expansion of the two materials. Furthermore, any break in the coating will result in the underlying chute material coming into contact with liquid or other types of processing materials, thus causing corrosive or abrasive wear that will over time significantly deteriorate the quality and strength of the chute. This same result can, of course, occur even when steel liners or plates are affixed to chutes. And it almost goes without saying that the various attempts to protect in these processing plant chutes result in permanent alteration of the chutes. That is, the various liners and coatings become integral parts of the chutes, rendering further repair even more difficult, if not impossible.

U.S. Pat. No. 5,035,313, "Telescopic chute for a mixer truck," issued Jul. 30, 1991 to Smith discloses a dispensing chute for attachment to a mixer truck comprising a plurality of telescopically mounted sections. The chute sections are in the form of interlocking open top curved metal sections having replaceable plastic liners affixed to interior portions of the metal sections.

U.S. Pat. No. 4,054,194 "Discharge chute for concrete mix," issued Oct. 18, 1977 to Davis discloses a conveying chute for freshly mixed concrete made with cross members at each end of the chute connected by two outer longitudinal members on opposite sides of the chute. It also has a bottom member between the cross members along the bottom of the chute. The chute includes a metal mesh reinforced polyurethane liner fastened to the cross members at each end of the chute by sets of bolts and nuts.

Existing concrete chutes used with aggregate transport vehicles or with stationary processing mining material and mixing plants, are typically made of steel with and without reinforcing members. Such chutes are heavy and difficult to manipulate. Also, chutes associated with aggregate transport are subject to a great deal of wear and tear not only by the impact and abrasion resulting from the movement of the aggregate or other fluent materials, but also by the impact of other machinery and equipment. In response to such conditions, chutes have been developed that have a liner attached in the chute to ameliorate the abrasion and impact conditions experienced by the chute during their use.

These devices typically will bolt or otherwise fasten the liner to the chute in order to maintain the liner within the chute throughout the chute's operational positions. Problems continue to exist; however, in that the fasteners wear as the ore moves over the fasteners, and the fasteners are subject to corrosion and rust either from the ores' chemical composition or from the process fluids.

Other liners have been laminated to the chute in order to avoid the wear and corrosion of hardware described above. However, the laminated liners, experience different thermal expansion characteristics which causes stress and cracks that allows aggregate and other fluent materials to attack the chute. Also, laminated liners cannot be easily replaced or repaired and typically a new chute is required. Other chutes composed of materials other than metal and with or without liners have also been used. However, such chutes are not as resilient to the conditions they are exposed to and further cracking and breaking requires replacement of the entire chute.

A need exists for a lightweight but strong chute for use with processing plants in the mining material industry. Elastomers such as rubber and urethane are better suited than other plastics, metals, or other materials, because of their resistance to abrasion, elasticity, and because of their relatively low weight. Urethane is also of special interest due to its particularly smooth surface. U.S. Pat. No. 4,362,231, "Chute for Transporting Timber," issued Dec. 7, 1982 to Meyer utilizes polyurethane material to construct the chute.

The present invention provides a solution to these needs and other problems, and offers other advantages over the prior art.

BRIEF SUMMARY OF THE INVENTION

The present invention is related to an apparatus that solves the above-mentioned problems. In accordance with one embodiment of the invention, a chute constructed from urethane wear material within a rib cage for support is described. In particular, several ribs are dispersed throughout the length of the chute for support of the flexible urethane wear sheet. A flexible sheet has a reinforced edge with varying thicknesses to accommodate different weight loads and abrasive conditions. Furthermore, the chute has interlocking edges for ease of constructing long lengths from a series of shorter sections. These shorter sections are easier to transport to a processing plant or other site where the chute is to be installed. Another feature is that the flexible sheet is formed such that it may be installed in the rib cage in a tool less manner without need for fasteners. Preferably, the chute is easily maintainable and can incorporate wear resistant inserts such as ceramics for additional wear resistance.

Additional advantages and features of the invention will be set forth in part in the description which follows, and in part, will become apparent to those skilled in the art upon examination of the following or may be learned by practice of the invention.

BRIEF DESCRIPTION OF THE DRAWINGS

Throughout the drawings, the same reference numerals indicate similar or corresponding features or functions.

DETAILED DESCRIPTION

Figure 1:
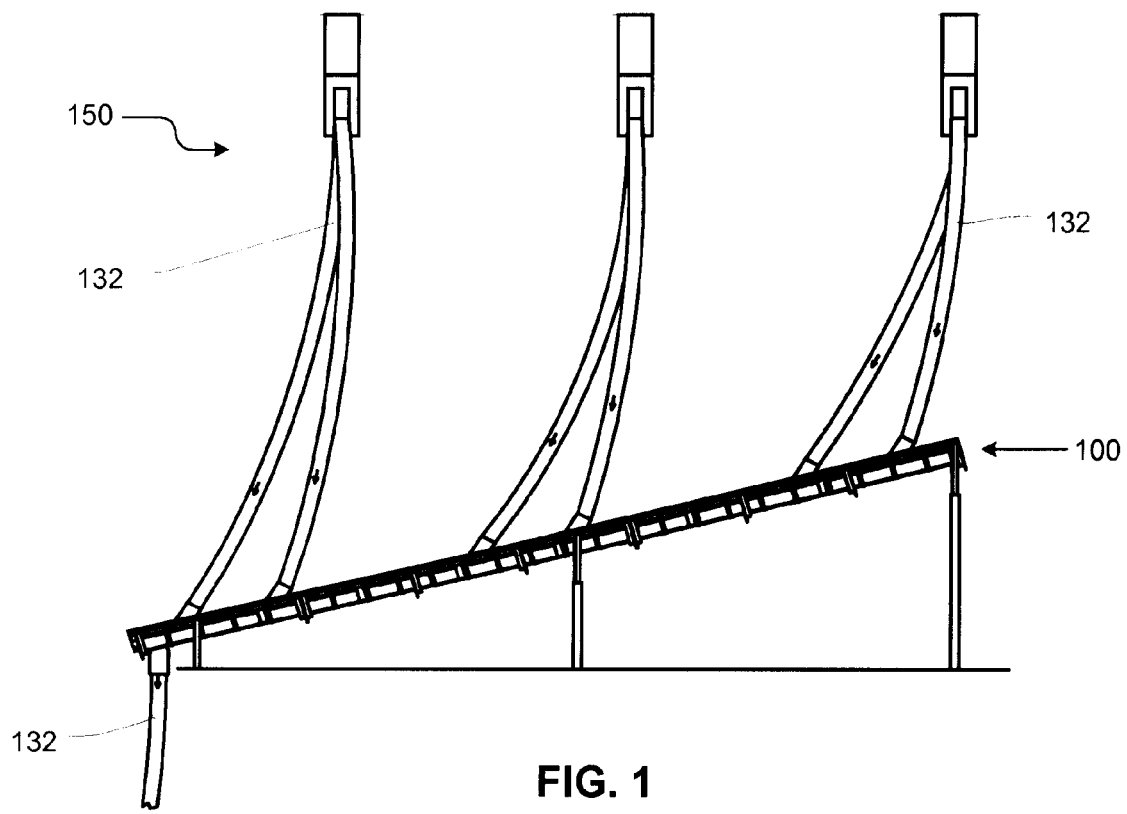
FIG. 1 illustrates a processing plant with chutes in place to transport mining material in accordance with one aspect of this invention.

In FIG. 1 an example of the invention, a hanging chute 100, is shown incorporated into a processing plant 150. It will be understood by those skilled in the art that chutes transport material from one piece of equipment in a processing plant 150 to another. It will further be understood by those skilled in the art that significant dust generation may result if chutes are not designed properly. The chutes should be large enough to avoid jamming of material and reduce fugitive material escape.

Figure 2:
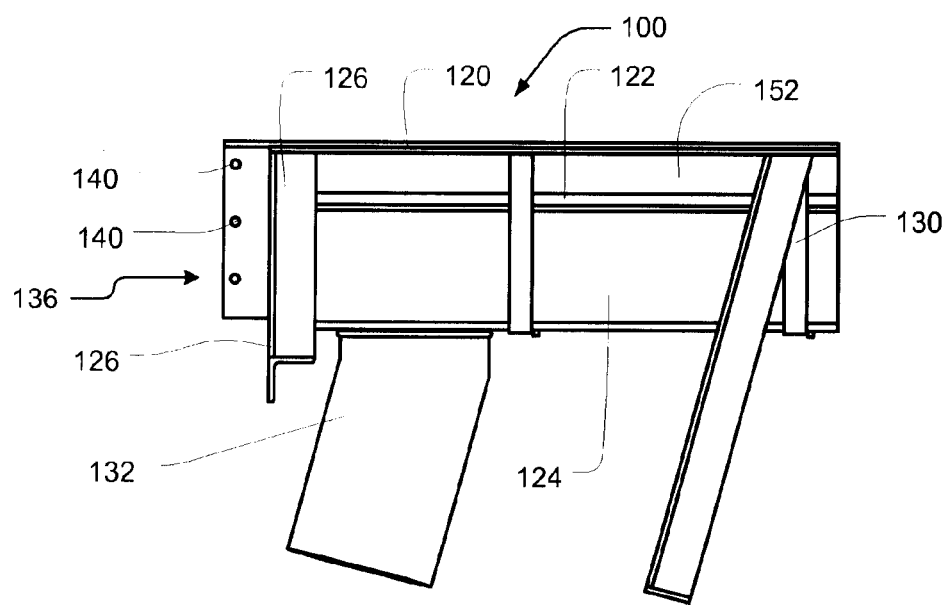
FIG. 2 illustrates a side view of a hanging chute in accordance with one aspect this invention.

Turning now to FIG. 2, a side view of the hanging chute 100 is shown. The hanging chute 100 has an upper ridge 120 that fits over a top rib 152. This engagement of the upper ridge 120 with the top rib 152 ensures that material will not seep out of the chute. The hanging chute 100 also has ribs 130 that engage to a flexible sheet 124. These ribs 130 are dispersed throughout the length of the flexible sheet 124 at various intervals to form a rib cage. It will be understood by those skilled in the art that the flexible sheet 124 may alternatively be constructed from a material or composite consisting of polyurethane, polyethylene, high density polyethylene, polypropylene, glass reinforced plastics, polyethylene terephthalate, and polyestrene. However, in the preferred embodiment of the invention, the flexible sheet 124 should be constructed from urethane. This is because urethane is flexible and lighter and therefore easier to transport and install. Furthermore, urethane is also more resistant to wear and tear that occurs from the transport of materials through chutes in the processing plant 150. In the alternative, various forms of rubber may be used to form the flexible sheet 124. It will be understood by those skilled in the art that rubber is often better suited for "grizzly" type chutes where large bulk material needs to be moved.

Looking again at FIG. 2, the hanging chute 100 also has a lower ridge 122 that acts as a latching mechanism to hold flexible sheet 124 in place. Alternatively, lower ridge 122 may also be configured to act as a spacer to help shape the flexible sheet 124. It will be understood by those skilled in the art that a mining material conduit 132 is incorporated into the hanging chute 100 to transfer material into other hanging chutes 100 or other equipment in the processing plant 150.

Figure 3:
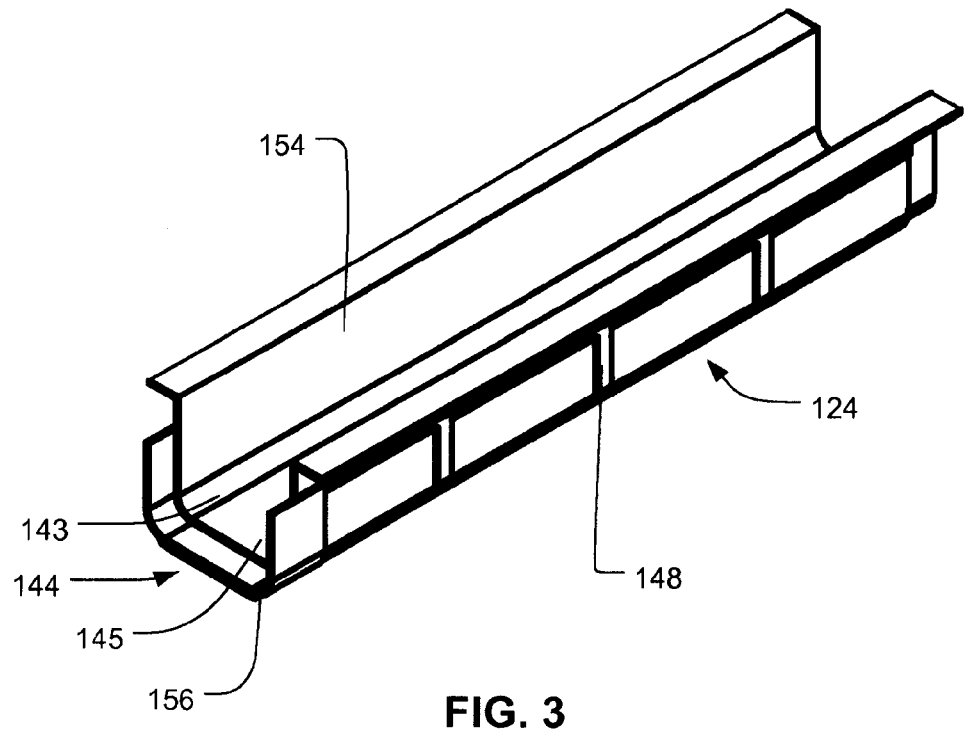
FIG. 3 is a perspective view of one overlapping urethane sheet in accordance with one aspect of this invention.

FIG. 3 illustrates a perspective view of one overlapping sheet 124 in accordance with this invention. It will be understood by those skilled in the art that when fine material and lumps are mixed in a product stream, the chute depth should be at least three times the maximum lump size to avoid jamming or overflow. Furthermore, the chute should be designed so that material falls into the flat bottom 145. The flexible sheets 124 are placed in an overlapping position to one another so as to prevent material from escaping the product stream. FIG. 3 depicts the shape taken by the flexible sheet 124 once it is installed in rib cage 130.

A sloping bottom 144 with a flat bottom 145 and radius corner 143 is also shown. The sloping bottom 144 greatly reduces plugging of the chute by preventing material and lumps from gathering unnecessarily. It will be understood that the sloping bottom 144 can be in a U-shape form as normally found in the art or any variation thereof. The sloping bottom is adjacent to a urethane wall 154 and a point of inflection 156. The flat bottom 145 depicted in FIG. 3 is beneficial in resisting sliding abrasion since the flowing ore is distributed over a greater surface area than in a U-shaped chute. Radius corner 143 directs flow toward the flat bottom 145 and helps resist build up of sticky materials.

Wherever possible, material flowing through the hanging chute should fall onto the sloping bottom 144 of the flexible sheets 124 to reduce dust and noise generation, absorb impact of incoming material, reduce wear and abrasion of chute surfaces, and reduce the height of material fall. Abrupt changes of direction must be avoided to reduce the possibility of material buildup, material jamming and dust generation. Having the sloping bottom 144 prevents this backflow of the mining material stream.

Figure 4:
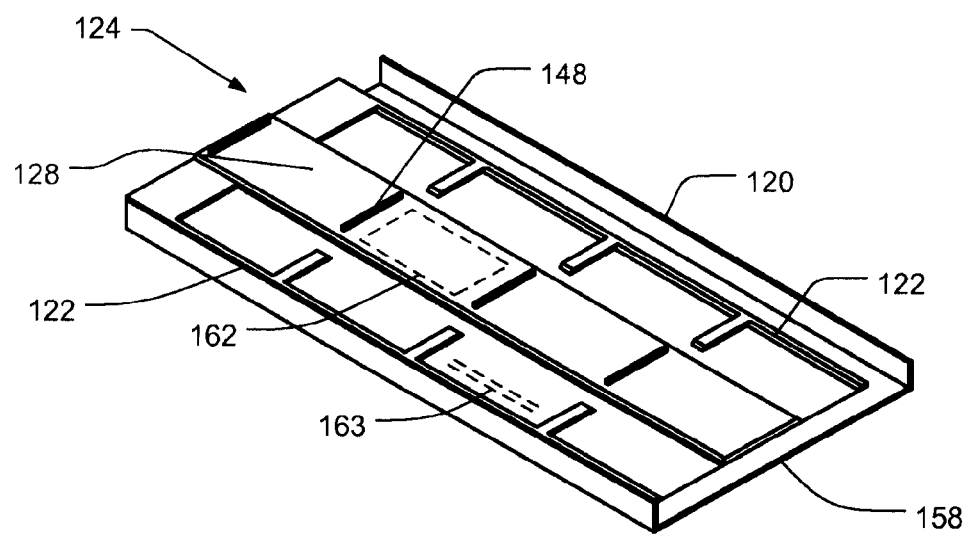
FIG. 4 is a bottom view of a featured urethane sheet in a relaxed flat condition accordance with one aspect of this invention.

FIG. 4 is a bottom view of a flexible sheet 124 in accordance with one aspect of the invention. The flexible sheet 124 is constructed with rib channels 148 that engage the ribs 130. The rib channels 148 are molded into the flexible sheet 124 during construction to plan the location of the ribs 130. The flexible sheet 124 also shows the upper ridge 120 and lower ridge 122. A reinforced edge 128 is shown on the flexible sheet 124. This reinforced edge 128 also helps reduce wear and abrasion of the hanging chute 100. The reinforced edge 128 may be reduced or increased in thickness depending on the material to be moved. For instance, if a slurry type of material needs to be moved, the reinforced edge 128 may be thinner for reduced weight. However, if large aggregate material needs to be moved, then the reinforced edge 128 may be thicker for increased reduction of wear and tear.

Figures 5, 6, 7:
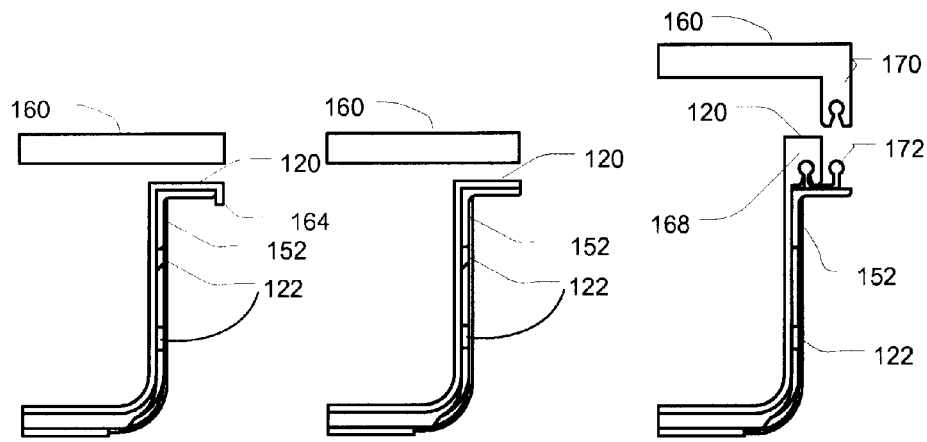
FIGS. 5, 6 and 7 are end views of three different embodiments of an upper ridge of the urethane sheet that fits over a top rib of a rib cage and engages a lid surface in accordance with various aspects of this invention.

In FIGS. 5, 6, and 7, end views of three different embodiments of an upper ridge 120 of the flexible sheet 124 that fits over a top rib 152 of a rib cage and engages a lid surface 160. The lid surface 160 may be placed on an open side of the hanging chute 100 (see FIG. 10). The lid surface 160 covers the stream of material and prevents deflecting debris similar to the chute cap 138. The lid surface 160 may be constructed from materials similar to that of the flexible sheet 124. The flexible sheet 124 also has a lower ridge 122 that acts as a latching mechanism to hold flexible sheet 124 in place against the rib cage. In FIG. 5, an overhanging edge 164 has been added to the upper ridge 120 such that they collectively form a channel into which the top rib 152 is placed. In FIG. 7, a snap fit female connector 168 has been added to the upper ridge 120 that matingly fits a reciprocal male connector 172 formed along the length of the top rib 152. Similarly, a female connector 170 has been added to lid surface 160 that matingly fits a male connector 172. Together these connectors provide a toolless connection of the flexible sheet 124 to the ribs 130 and an optional lid surface 160 to the ribs. It will be appreciated by those skilled in the art that other forms of lid surface, upper ridge, and top rib engagement may be provided without departing from the scope and spirit of the present invention.

In alternative embodiments of the invention, a wear insert 162 (un-shown item in bottom of chute) can also be incorporated into the reinforced edge 128 for increased reduction of wear and tear. Some examples of wear inserts 162 may be ceramics, carbides, chrome iron or other high wear compounds. It will be understood by those skilled in the art that the modular nature of the chute allows strategic placement and replacement in a simplified manner.

Moreover, in preferred embodiments, the flexible sheet 124 has interlocking edges 158 that aid in connecting the flexible sheets 124 together. This makes transfer, assembly, and disassembly of the hanging chute 100 easier. It will be understood by those skilled in the art that the interlocking edges 158 utilize male and female connections, but may be as simple as overlapping joints. Replacement or repair has been difficult in the past due to the welded or bolted metal sheets that were used in the construction of the chutes. The use of interlocking edges 158 minimizes the problem of replacement and repair by reducing labor, time, and increasing safety of the laborers.

Figure 8:
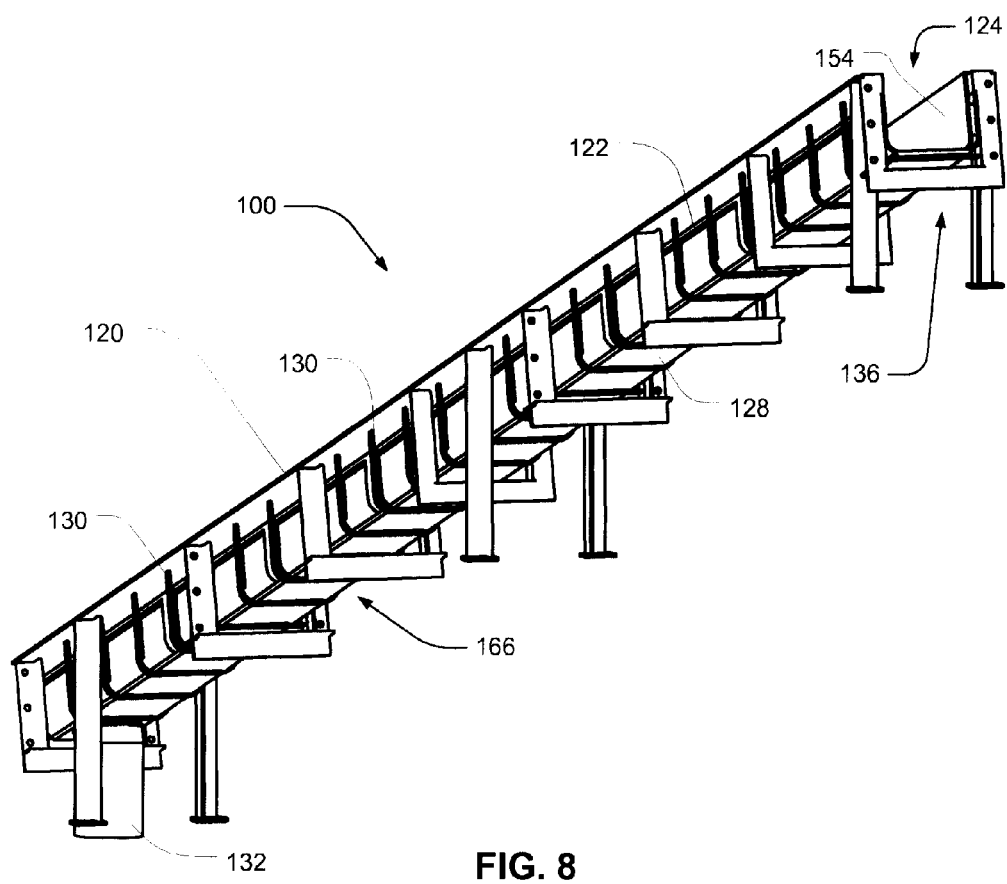
FIG. 8 is a perspective view of a hanging chute incorporated into a processing plant in accordance with one aspect of this invention.

FIG. 8 is a perspective view of a hanging chute 100 incorporated into a processing plant 150 in accordance with one aspect of this invention. In a preferred embodiment of the invention, the reinforced edge 128 appears on a lower surface 166 of the hanging chute 100. The upper ridge 120 and the lower ridge 122 are shown again in detail. Several ribs 130 engage the flexible sheet 124 at various intervals 148 (see FIG. 4) and secure the hanging chute to processing plant 150 and resist moving with the material flow. It will be understood by those skilled in the art that aggregate conduits 132 are shown in FIG. 8 to further demonstrate the flow of material. The reinforced edge 128 is shown at a lower surface of the hanging chute 100. This reinforced edge 128 helps absorb heavy impact on the chute when materials drop from the conduits 132. In most applications, the combination of the flexible sheet 124, reinforced edge 128, sloping bottom 144, and the various ribs 130 are sufficient to absorb the heavy impact on the chute 100. Alternatively, the flexible sheet 124 may have internal steel rods 163 molded into the sheet 124 to further stabilize the apparatus.

It will be understood by those skilled in the art that the mining and material handling industries move a great variation in weight and size of substances. Accordingly, the flexible sheet 124 may be thinner in zone 154 to conserve costly wear resistant material in this low wear zone. Meanwhile, the reinforced edge 128 can be constructed with a thicker cross section to accommodate higher wear rate or impact absorption. The cross sections joining these two may have a variable thickness to accomplish the proper curved corners 143.

Figure 9:
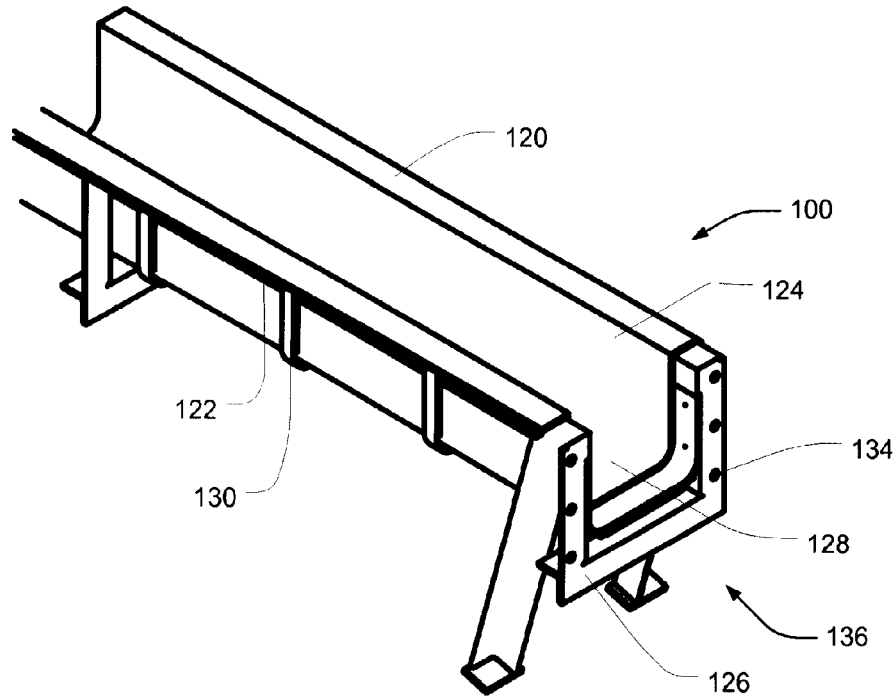
FIG. 9 illustrates a perspective view of a feed end in accordance with one aspect of this invention.

FIG. 9 illustrates a perspective view of the hanging chute's feed end 136. The flexible sheet 124 is shown attached to the end rib 126 by use of fasteners 140. The fasteners 140 are attached to fastener holes 134 on the end rib 126. It will be understood by those skilled in the art that fasteners 140 can be nut and bolt combinations, nails, pins or any common fastener found in the art. The reinforced edge 128 is shown again on the lower surface of the hanging chute 100. FIG. 9 illustrates feed end 136 without a chute cap 138. Support rib structure incorporates a bolting flange on ends 126 to allow modular construction and installation of rib structure to accommodate different lengths of carrier frames.

Figure 10:
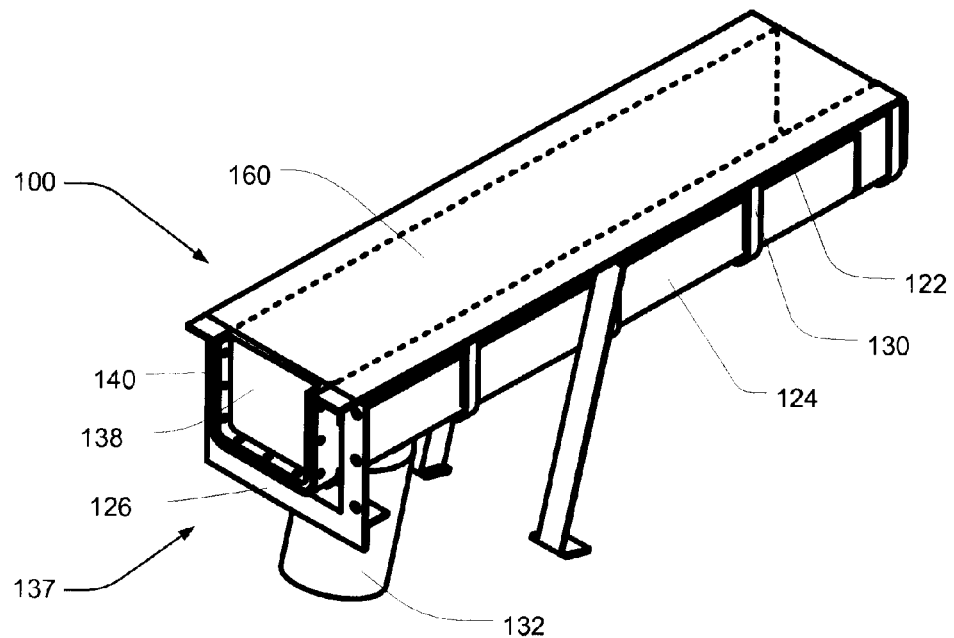
FIG. 10 illustrates another perspective view of a discharge end with a chute cap in accordance with one aspect of this invention.

Turning now to FIG. 10, the discharge end 137 is shown with a chute cap 138. The chute cap 138 is, in preferred embodiments, constructed from material similar to the flexible sheet 124. The chute cap 138 is attached to the tail end 136 with fasteners 140. It will be understood by those skilled in the art that the chute cap 138 can be constructed from plastics or metals. The object of the chute cap 138 is to prevent back spill and dust emission from the tail end of the hanging chute 100. Additionally, debris may be deflected off the interior surfaces of the hanging chute 100 and thrown at an undesirable trajectory. Having a chute cap 138 prevents such occurrences. Furthermore, a snap spout 132 may be attached to the discharge end 137 with or without fasteners 140. It will be understood by those skilled in the art that a snap spout 132 is a separate molded piece of equipment that may be cylindrical in shape.

The foregoing merely illustrates the principles of the invention. It will thus be appreciated that those skilled in the art will be able to devise various arrangements which, although not explicitly described or shown herein, embody the principles of the invention and are thus within its spirit and scope. Although the hanging chute 100 is utilized in this description with mining industries, the invention may also be utilized in various material handling industries. For example, the hanging chute 100 and all of its embodiments may be incorporated into agricultural systems to move farm produce, grains, meat, and waste. Furthermore, the hanging chute 100 may be incorporated into delivery of materials from the dock to assigned space, removing empty crates, returning crates at end for re-crating, and delivering materials back to dock for carrier loading. These and other features will be evident to one of ordinary skill in the art in view of this disclosure, and are included within the scope of the following claims.

What is claimed is:

1. A flexible sheet for use in a hanging chute utilized in moving materials, the flexible sheet comprising:
    at least one wall;
    an upper ridge formed along an edge of the at least one wall;
    a sloping bottom connected with the at least one wall, wherein the sloping bottom comprises a radius corner connected to a flat bottom;
    a reinforced edge formed integrally with a portion of the sloping bottom; and
    at least one member molded into the sheet and operatively configured for engagement with a portion of the hanging chute, wherein the at least one member molded into the sheet is non-continuous across the length of the sheet.

2. The flexible sheet of claim 1 wherein the at least one member comprises at least one rib channel molded into the sheet and operatively configured for engagement with at least one rib within the hanging chute.

3. The flexible sheet of claim 1 wherein the at least one member molded into the sheet and operatively configured for engagement with a portion of the hanging chute extends in a generally perpendicular direction relative to the length of the sheet.

4. The flexible sheet of claim 1 further comprising interlocking edges operatively configured to facilitate in construction and transportation of chutes having more than one flexible sheet.

5. The flexible sheet of claim 1 further comprising material molded into the flexible sheet for increased strength over sheets without reinforcement.

6. The flexible sheet of claim 1 wherein the flexible sheet upper ridge is operatively configured for engagement with a top rib within the hanging chute.

7. The flexible sheet of claim 6 further comprising an overhanging edge adjacent to the upper ridge that together form a channel operatively configured for placement of the top rib in the channel.

8. The flexible sheet of claim 6 wherein the flexible sheet upper ridge further comprises a snap fit connector operatively configured for engagement with a reciprocal snap fit connector on the top rib.

9. The flexible sheet of claim 1 further comprising a lower ridge spaced apart from the upper ridge and formed in an area of the at least one wall, wherein the flexible sheet lower ridge is operatively configured for engagement with at least one rib within the hanging chute to act as a latching mechanism to hold the flexible sheet in place.

10. A flexible sheet for use in a hanging chute utilized in moving materials, the flexible sheet comprising:
    at least one wall;
    an upper ridge formed along an edge of the at least one wall;
    a sloping bottom connected with the at least one wall, wherein the sloping bottom comprises a radius corner connected to a flat bottom;
    a reinforced edge formed integrally with a portion of the sloping bottom; and
    a wear insert formed into the flexible sheet.

11. A flexible sheet for use in a hanging chute utilized in moving materials, the flexible sheet comprising:
    at least one wall with an inflection point in an area of the at least one wall;
    a sloping bottom located adjacent to the inflection point;
    a reinforced edge formed integrally with a portion of the sloping bottom; and
    at least one member molded into the sheet and operatively configured for engagement with a portion of the hanging chute, wherein the at least one member molded into the sheet is non-continuous across the length of the sheet.

12. The flexible sheet of claim 11 wherein the at least one member comprises at least one rib channel molded into the sheet and operatively configured for engagement with at least one rib within the hanging chute.

13. The flexible sheet of claim 11 further comprising interlocking edges operatively configured to facilitate in construction and transportation of chutes having more than one flexible sheet.

14. The flexible sheet of claim 11 further comprising material molded into the flexible sheet for increased strength over sheets without reinforcement.

15. The flexible sheet of claim 11 wherein the flexible sheet comprises an upper ridge operatively configured for engagement with a top rib within the hanging chute.

16. The flexible sheet of claim 15 further comprising an overhanging edge adjacent to the upper ridge that together form a channel operatively configured for placement of the top rib in the channel.

17. The flexible sheet of claim 15 wherein the flexible sheet upper ridge further comprises a snap fit connector operatively configured for engagement with a reciprocal snap fit connector on the top rib.

18. The flexible sheet of claim 11 further comprising a lower ridge spaced apart from an upper ridge and formed in an area of the at least one wall wherein the flexible sheet lower ridge is operatively configured for engagement with at least one rib within the hanging chute to act as a latching mechanism to hold the flexible sheet in place.

19. The flexible sheet of claim 11 wherein the at least one member molded into the sheet and operatively configured for engagement with a portion of the hanging chute extends in a generally perpendicular direction relative to the length of the sheet.

20. A flexible sheet for use in a hanging chute utilized in moving materials, the flexible sheet comprising:
    at least one wall with an inflection point in an area of the at least one wall;
    a sloping bottom located adjacent to the inflection point;
    a reinforced edge formed integrally with a portion of the sloping bottom; and
    a wear insert formed into the flexible sheet.

* * * * *